(12) United States Patent
Hamada et al.

(10) Patent No.: US 6,555,637 B1
(45) Date of Patent: Apr. 29, 2003

(54) ANIONIC POLYMERIZATION PROCESS, AND PROCESS FOR PRODUCING A POLYMER BY THE ANIONIC POLYMERIZATION PROCESS

(75) Inventors: Kenichi Hamada, Tsukuba (JP); Kazushige Ishiura, Tsukuba (JP); Masaji Kato, Tsukuba (JP); Sachie Yaginuma, Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 66 days.

(21) Appl. No.: 09/638,149

(22) Filed: Aug. 15, 2000

(30) Foreign Application Priority Data

Aug. 24, 1999 (JP) ............................................ 11-236445

(51) Int. Cl.$^7$ .................................................. C08F 4/52
(52) U.S. Cl. .......................... 526/186; 526/89; 526/209; 526/215; 526/216; 526/217; 526/226; 526/303.1; 526/307.1; 526/316; 526/317.1; 526/318; 526/319
(58) Field of Search .................................. 526/186, 319, 526/328, 329.7, 89, 226, 318, 215, 216, 217, 303.1, 307.1, 316, 317.1; 502/209, 303, 215

(56) References Cited

U.S. PATENT DOCUMENTS

| 3,716,495 | A |  | 2/1973 | Hsieh | |
|---|---|---|---|---|---|
| 5,180,799 | A |  | 1/1993 | Ballard et al. | |
| 5,656,704 | A |  | 8/1997 | Wang et al. | |
| 5,670,592 | A |  | 9/1997 | Teyssie et al. | |
| 6,228,946 | B1 | * | 5/2001 | Kitayama et al. | 525/242 |
| 6,271,324 | B1 | * | 8/2001 | Jungling et al. | 526/173 |
| 6,329,480 | B1 | * | 12/2001 | Uchiumi et al. | 526/173 |

FOREIGN PATENT DOCUMENTS

| DE | 196 48 565 | 5/1998 |
|---|---|---|
| JP | 7-57766 | 6/1995 |
| WO | WO 98/23651 | 6/1998 |

OTHER PUBLICATIONS

Tatsuki Kitayama, et al. "Polymer Preprints", Japan, vol. 46, No. 7, pp. 1081–1082, 1997.

Tatsuki Kitayama, et al. "Polymer Preprints", Japan, vol. 47, No. 2, p. 179, 1998.

Tatsuki Kitayama, et al. "Living and Highly Syndiotactic Polymerization of Methyl Methacrylate and Other Methacrylates by Tert–Butyllithium–Trialkylaluminium in Toluene", Makromol. Chem., Supplement. vol. 15, pp. 167–185, 1989.

D. G. H. Ballard, et al. "Controlled Polymerization of Methyl Methacrylate Using Lithium Aluminum Alkyls", Macromolecules, vol. 25, No. 22, pp. 5907–5913, 1992.

Helmut Schlaad, et al. "Mechanism of Anionic Polymerization of (Meth)acrylates in the Presence of Aluminum Alkyls. 5. Effect of Lewis Bases on Kinetics and Molecular Weight Distributions", Macromolecules, vol. 31, No. 3, pp. 573–577, 1998.

* cited by examiner

*Primary Examiner*—Tatyana Zalukaeva
(74) *Attorney, Agent, or Firm*—Oblon, Spivak, McClelland, Maier & Neustadt, P.C.

(57) ABSTRACT

In anionic polymerization using an anionic polymerization initiator, a tertiary organoaluminum compound (A) having in the molecule thereof a chemical structure represented by a general formula: Al—O—Ar wherein Ar represents an aromatic ring, and at least one Lewis base (B) selected from the group consisting of a tertiary polyamine compound, are caused to be present in the polymerization system. In this way, the polar monomer can be polymerized with a high polymerization initiation efficiency and a high living polymerization property and at a high polymerization rate even if the used polymerization initiator is suitable for industrial use, and a relatively mild cooling condition or a temperature condition near room temperature is adopted as a polymerization temperature condition.

8 Claims, 2 Drawing Sheets

FIG. 1

[TIME (min)]

FIG. 2

[TIME (min)]

ANIONIC POLYMERIZATION PROCESS, AND PROCESS FOR PRODUCING A POLYMER BY THE ANIONIC POLYMERIZATION PROCESS

BACKGROUND OF THE INVENTION

1. Field of the Invention

The present invention relates to an anionic polymerization process of polymerizing an anionic polymerizable monomer with an anionic polymerization initiator, and a process for producing a polymer using this polymerization process.

2. Related Art of the Invention

Various investigations have been made on a process of subjecting a polar monomer such as a methacrylic acid ester or an acrylic acid ester to anionic polymerization. However, such a polar monomer has a moiety which receives nucleophilic attack easily, such as a carbonyl group. Upon anionic polymerization for the polar monomer, therefore, it is relatively difficult that a high living polymerization property is exhibited since there arises a side reaction of the monomer or an intermolecular cyclization reaction (so-called back biting) at the growing terminal of the resultant polymer.

It is suggested that when a polar monomer is subjected to anionic polymerization using an organolithium compound as a polymerization initiator, an organoaluminum compound is caused to be present in the polymerization system. According to this manner, the organoaluminum compound coordinates to the growing terminal. Thus, the growing terminal can be stabilized so that its nucleophilicity can be lowered. As a result, it appears that the living polymerization property upon the polymerization can be raised. As processes for performing anionic polymerization of a polar monomer in the presence of an organoaluminum compound, using an organolithium compound as a polymerization initiator, the following processes (1)–(6) are reported:

(1) a process of performing a polymerization reaction of a methacrylic acid ester in the presence of an organoaluminum compound such as trialkylaluminum or dialkyl (diphenylamino)aluminum in an aromatic hydrocarbon solvent, using t-butyllithium as a polymerization initiator (JP-B-H7-57766), (2) a process of polymerizing amethacrylic acid ester in the presence of a specific organoaluminum compound having one or more bulky groups (for example, triisobutylaluminum or diisobutyl(2,6-di-t-butyl-4-methylphenoxy) aluminum) in a hydrocarbon solvent, using an organolithium compound such as t-butyllithium as a polymerization initiator (U.S. Pat. No. 5,180,799), (3) a process of polymerizing methyl methacrylate in the presence of an organoaluminum compound, such as methylbis(2,6-di-t-butylphenoxy)aluminum, ethylbis(2,6-di-t-butylphenoxy)aluminum, isobutylbis(2,6-di-t-butylphenoxy)aluminum or tris(2,6-di-t-butylphenoxy) aluminum, in an aromatic hydrocarbon solvent, using an organolithium compound as a polymerization initiator (U.S. Pat. No. 5,656,704), (4) a process of polymerizing a methacrylic acid ester or an acrylic acid ester in the presence of methylbis(2,6-di-t-butylphenoxy)aluminum or ethylbis(2,6-di-t-butylphenoxy)aluminum in toluene, using t-butyllithium as a polymerization initiator (Polymer Preprints, Japan, Vol. 46, No. 7, pp. 1081–1082 (1997) and Polymer Preprints, Japan, Vol. 47, No. 2, p. 179 (1998)), (5) a process of polymerizing methyl methacrylate in the presence of trialkylaluminum in toluene, using t-butyllithium as a polymerization initiator (Makromol. Chem., Supplement. Vol. 15, pp. 167–185 (1989)), and (6) a process of polymerizing methyl methacrylate in the presence of diisobutyl(2,6-di-t-butyl-4-methylphenoxy) aluminum in toluene, using t-butyllithium as a polymerization initiator (Macromolecules, Vol. 25, pp. 5907–5913 (1992)).

Furthermore, it is reported that when a polarmonomer is subjected to anionic polymerization in the presence of an organoaluminum compound using an organolithium compound as a polymerization initiator, a certain additive is caused to be present in the polymerization system so that the rate of the polymerization can be increased or so that uniformity of the polymerization is improved and the molecular weight distribution of the resultant polymer can be narrowed. Such reports are, for example, about the processes (7) and (8).

(7) When a methacrylic acid ester is polymerized in the presence of trialkylaluminum in toluene using t-butyllithium as a polymerization initiator, the rate of the polymerization is improved and the molecular weight distribution of the resultant polymer is narrowed by adding to the polymerization system an ester compound, such as methyl pivalate or diisooctyl phthalate, in an amount of about 10% by weight of toluene (solvent). In the case in which a crown ether such as 12-crown-4 is added instead of the ester compound, the same improvement effects are exhibited. However, in the case in which tetrahydrofuran, 1,2-dimethoxyethane, N-methylpyrrolidine or the like is caused to be present instead of the ester compound, the improvement effects are not exhibited (Macromolecules, Vol. 31, pp. 573–577 (1998)).

(8) When a methacrylic acid ester or an acrylic acid ester is polymerized in the presence of an organoaluminum compound such as trialkylaluminum in a hydrocarbon solvent using an organolithium compound such as ethyl α-lithioisobutyrate or t-butyllithium as a polymerization initiator, the rate of the polymerization is improved and the molecular weight distribution of the resultant polymer is narrowed by adding to the polymerization system an ether compound such as triethylene glycol dimethyl ether (triglyme), dimethoxyethane or crown ether, or an organoquaternary salt such as tetraalkylammonium halide or tetraphenylphosphonium halide (International publication: WO98/23651).

As described as the above-mentioned processes (1)–(8), various suggestions are made on processes of anionic polymerization of a polar monomer in the presence of an organolithium compound and an organoaluminum compound. However, the polymerization initiators that are actually used in these processes are limited to specific compounds such as t-butyllithium and ethyl α-lithioisobutyrate. This would be because it is considered that a high polymerization initiation efficiency and a high polymerization rate can be attained. However, t-butyllithium has mighty self-ignition ability, and has problems about safety thereof and handling performances upon transportation, storage and the like. Concerning ethyl α-lithioisobutyrate, an operation for synthesizing it and a subsequent purifying operation are complicated. For these reasons, it is difficult to say that these polymerization initiators, which make it possible to attain a high polymerization initiation efficiency and a high polymerization rate, are suitable for use in an industrial scale. Besides, examples of specific experiments reported as the processes (1)–(8) include examples wherein polymerization initiation efficiency is insufficient for practical use.

In the case in which a polar monomer such as a methacrylic acid ester or an acrylic acid ester is block-copolymerized with another monomer, a living polymer resulting from the polymerization of the one monomer needs to have such a high living polymerization property that causes the polymerization of the other monomer to start. However, in order to exhibit such a high living polymerization property upon anionic polymerization in the presence of an organolithium compound and an organoaluminum compound, it is necessary in many cases to set the temperature upon the polymerization to a very low temperature, for example, about −60° C. In such polymerization operation at a very low temperature, many facilities become necessary for cooling. Thus, industrial adoption of this operation is disadvantageous. Moreover, in the case in which an ester of a primary alcohol and acrylic acid, such as n-butyl acrylate, is used as the polar monomer upon polymerization, the living polymerization property upon the polymerization becomes especially low. By the inventors' investigations, the following results were obtained: when an ester of a primary alcohol and acrylic acid was polymerized in a reaction system in the presence of trialkylaluminum and a crown ether or an organoquaternary salt as reported as the process (8) at a very low temperature of about −78° C., the living polymerization property of the resultant polymer of the acrylic acid ester was lost; therefore, in the case wherein the polymer was subsequently brought into contact with another polar monomer such as methyl methacrylate, no polymerization was able to start. Furthermore, in the case in which an acrylic acid ester is polymerized at a very low temperature as described above, the resultant polymer of the acrylic acid ester has high steroregularity and high crystallinity. Thus, the polymer may be insufficient in flexibility. Therefore, in order to obtain an acrylic acid ester polymer having excellent flexibility, it is not preferred to perform the polymerization reaction at a very low temperature as described above. From these standpoints, there has not yet been found an industrially-profitable process for producing a block copolymer of a polar monomer, such as a methacrylic acid ester or an acrylic acid ester, in the actual situation.

From the above-mentioned standpoints, all of the following requirements are important for making anionic polymerization of a polar monomer profitable for industrial enforcement: the rate of the polymerization is high; the initiation efficiency of the polymerization is high; the range of a polymerization initiator which can be used is wide; the living polymerization property upon the polymerization is high (that is, the molecular weight distribution of the resultant polymer is narrow and the production ratio of a block copolymer in block copolymerization is high): and cooling conditions upon the polymerization can be made mild.

SUMMARY OF THE INVENTION

Therefore, a problem to be solved in the present invention is to provide in anionic polymerization of a polar monomer a polymerization process making it possible to attain a high polymerization initiation efficiency and a high polymerization rate, using a polymerization initiator relatively excellent in safety, availability, and handling performances, which process makes it possible to produce a polymer having a relatively narrow molecular weight distribution because a high living polymerization property can be exhibited even if a relatively high polymerization temperature (that is, a relatively mild cooling condition or a condition of a temperature near room temperature) is adopted, and which process is also useful for production of a block copolymer.

Another problem to be solved in the present invention is to provide an industrially-profitable process for producing a polymer, using the above-mentioned polymerization process having such advantages described as above.

The inventors made eager investigations to solve the above-mentioned problems. As a result, it has been found that in the case wherein, at the time of polymerizing an anionic polymerizable monomer with an anionic polymerization initiator, a combination of a specific organoaluminum compound and a specific Lewis base is caused to be present in the polymerization system, it is possible to solve the problems about the above-mentioned aptitude of the polymerization initiator for industrial use (the safety, availability and handling performances), and the problems about the above-mentioned polymerization conditions and polymerization results (the temperature condition, polymerization initiation efficiency, polymerization rate and living polymerization property). Thus, the present invention has been made.

That is, a first aspect of the present invention is an anionic polymerization process, characterized in that when an anionic polymerizable monomer is polymerized with an anionic polymerization initiator, a tertiary organoaluminum compound (A) having in the molecule thereof a chemical structure represented by a general formula: Al—O—Ar wherein Ar represents an aromatic ring, and at least one Lewis base (B) selected from the group consisting of an ether compound and a tertiary polyamine compound are caused to be present in the polymerization system wherein the polymerization is performed.

A second aspect of the present invention is a process for producing a polymer, which comprises polymerizing an anionic polymerizable monomer by the above-mentioned anionic polymerization process (for example, a process for producing a block copolymer, which comprises polymerizing two or more anionic polymerizable monomers by the above-mentioned anionic polymerization process).

DETAILED DESCRIPTION OF THE INVENTION

The present invention will be described in detail hereinafter.

In the anionic polymerization according to the present invention, an anionic polymerizable monomer is polymerized with an anionic polymerization initiator.

The chemical structure of the anionic polymerizable monomer used in the present invention is not especially limited so far as the monomer has anionic polymerizability. However, a polar anionic polymerizable monomer having a heteroatom such as an oxygen atom or a nitrogen atom is preferred since the monomer can especially remarkably exhibit the advantageous effect of the present invention. Examples of the polar anionic polymerizable monomer include vinyl monomers having a polar group such as an α,β-unsaturated carboxylic acid ester compounds, α,β-unsaturated carboxylic acid amide compounds, α,β-unsaturated ketone compounds and 2-vinylpyridine; and lactone compounds such as ε-caprolactone. Preferred examples of the α, β-unsaturated carboxylic acid ester compound include acrylic acid esters such as methyl acrylate, ethyl acrylate, propyl acrylate, isopropyl acrylate, allyl acrylate, n-butyl acrylate, t-butyl acrylate, cyclohexyl acrylate, benzyl acrylate, 2-ethylhexyl acrylate, lauryl acrylate, glycidyl acrylate, trimethoxysilylpropyl acrylate, methoxyethyl acrylate, N,N-dimethylaminoethyl acrylate and N,N-diethylaminoethyl acrylate; methacrylic acid esters such as methyl methacrylate, ethyl methacrylate, propyl methacrylate, isopropyl methacrylate, ally methacrylate, n-butyl methacrylate, t-butyl methacrylate, cyclohexyl methacrylate, benzyl methacrylate, 2-ethylhexyl methacrylate, lauryl methacrylate, glycidyl methacrylate, trimethoxysilylpropyl methacrylate, methoxyethyl methacrylate, N,N-dimethylaminoethyl methacrylate and N,N-diethylaminoethylmethacrylate; α-alkoxyacrylic acid esters such as methyl α-methoxyacryalte and methyl α-ethoxyacrylate; crotonic acid esters such as methyl crotonate and ethyl crotonate; and 3-alkoxyacrylic acid esters such as 3-methoxyacrylic acid esters. Preferred examples of the α,β-unsaturated carboxylic acid amide compound include acrylamide compounds such as N-isopropylacrylamide, N-t-butylacrylamide, N,N-dimethylacrylamide, N,N-diethylacrylamide; and methacrylamide compounds such as N-isopropylmethacrylamide, N-t-butylmethacrylamide, N,N-dimethylmethacrylamide and N,N-diethylmethacrylamide. Preferred examples of the α,β-unsaturated ketone compound include methyl vinyl ketone, ethyl vinyl ketone, methyl isopropenyl ketone, and ethyl isopropenyl ketone. Among the above-mentioned monomers, especially preferred are acrylic acid esters, methacrylic acid esters, acrylamide compounds and methacrylamide compounds.

One of the anionic polymerizable monomers may be used alone, or two or more thereof may be used in combination. There may also be used, as a part of the anionic polymerizable monomer, a monomer having multifunctionality wherein the molecule thereof has two or more polymerizable groups such as a vinyl group, together with the anionic polymerizable monomer having monofunctionality as exemplified above. Examples of the monomer having multifunctionality include ethylene glycol diacrylate, ethylene glycol dimethacrylate, trimethylolpropane triacrylate, and trimethylolpropane trimethacrylate.

It is preferred that, if necessary, the anionic polymerizable monomer used in the present invention is sufficiently dried in advance under an inert gas flow or the like, in order to cause the polymerization reaction to advance smoothly. It is preferred to use a dehydrating/drying agent such as calcium hydride, molecular sieves or an activated alumina in the drying treatment.

The anionic polymerization initiator used in the present invention is not limited. However, the initiator is preferably an organolithium compound having in the molecular thereof one or more carbon atoms, which will be central anionic ion(s), and having, as the central counter ion(s) against the central anionic ion(s), lithium cationic ion(s) whose number is equal to the number of the central anionic ions. When attention is paid to the carbon atom, as the central anionic ion(s), of the organolithium compounds, the organolithium compounds can be classified into three types: organolithium compounds having a chemical structure wherein a tertiary carbon atom is the central anionic ion; organolithium compounds having a chemical structure wherein a secondary carbon atom is the central anionic ion; and organolithium compounds having a chemical structure wherein a primary carbon atom is the central anionic ion.

Typical examples of the organolithium compound having a chemical structure wherein a tertiary carbon atom is the central anionic ion include t-alkyllithium such as t-butyllithium and 1,1-dimethylpropyllithium; 1,1-diarylalkyllithium such as 1,1-diphenylhexyllithium and 1,1-diphenyl-3-methylpentyllithium; and α,α-dialkyl-α-lithioacetic acid esters such as ethyl α-lithioisobutyrate, butyl α-lithioisobutyrate and methyl α-lithioisobutyrate. Examples of the organolithium compound having a chemical structure wherein a secondary carbon atom is the central anionic ion include sec-alkyllithium such as isopropyllithium, 1-methylpropyllithium (that is, sec-butyllithium), 1-methylbutyllithium, 2-ethylpropyllithium and 1-methylpentyllithium; cycloalkyllithium such as cyclohexyllithium; diarylmethyllithium such as diphenylmethyllithium; and 1-alkyl-1-arylmethyllithium such as α-methylbenzyllithium. Examples of the organolithium compound having a chemical structure wherein a primary carbon atom is the central anionic ion include n-alkyllithium such as methyllithium, propyllithium, n-butyllithium and pentyllithium.

Among the above-mentioned organolithium compounds, the organolithium compound having a chemical structure wherein a secondary carbon atom is the central anionic ion is preferable from the viewpoint of very good balance between convenience for industrial use (low risk of ignition, and easiness of handling and production) and polymerization initiation ability. Lithium salts of hydrocarbons (the number of carbon atoms: 3–40) having a chemical structure wherein a secondary carbon atom is the central anionic ion are more preferable. 1-Methylpropyllithium (that is, sec-butyllithium) is most preferable.

In the present invention, one of the anionic polymerization initiators may be used alone, or two or more thereof may be used in combination.

The amount of the anionic polymerization initiator in the anionic polymerization according to the present invention is not limited. However, it is preferred in view of smooth production of a target polymer that the anionic polymerization initiator is used in an amount of 0.01 to 10 moles per 100 moles of the used anionic polymerizable monomer.

In the polymerization process according to the present invention, it is important that a specific organoaluminum compound and a specific Lewis base are both added to the polymerization system.

The organoaluminum compound used in the present invention is a tertiary organoaluminum compound having in the molecule thereof a chemical structure represented by a general formula: Al—O—Ar wherein Ar is an aromatic ring. This tertiary organoaluminum compound may be referred to "organoaluminum compound (A)" hereinafter.

The organoaluminum compound (A) used in the present invention may be appropriately selected dependently on the kind of the used anionic polymerizable monomer or the like. From the viewpoints of high polymerization rate, high polymerization initiation efficiency, a wide range of a usable polymerization initiator, and high living polymerization property and a mild cooling condition upon polymerization, it is preferred to use an organoaluminum compound represented by the following general formula (I) or (II):

$$AlR^1R^2R^3 \quad (I)$$

wherein $R^1$ represents a monovalent saturated hydrocarbon group which may have a substituent, a monovalent aromatic hydrocarbon group which may have a substituent, an alkoxy group which may have a substituent, an aryloxy group which may have a substituent or an N,N-disubstituted amino group; $R^2$ and $R^3$ each independently represents an aryloxy group which may have a substituent; or $R^2$ and $R^3$ may be bonded to each other to form an arylenedioxy group which may have a substituent; or $$AlR^4R^5R^6 \quad (II)$$

wherein $R^4$ represents an aryloxy group which may have a substituent; $R^5$ and $R^6$ each independently represents a monovalent saturated hydrocarbon group which may have a substituent, a monovalent aromatic hydrocarbon group which may have a substituent, an alkoxy group which may have a substituent, or an N,N-disubstituted amino group. The organoaluminum compounds represented by the general formulae (I) and (II) may be referred to as "organoaluminum compound (A-1)" and "organoaluminum compound (A-2)", respectively, hereinafter. The organoaluminum compound (A-1) is more preferred.

Examples of the aryloxy group that may have a substituent, which can be represented by $R^1$, $R^2$, $R^3$ or $R^4$ in the general formulae (I) and (II), include aryloxy groups having no substituent, such as phenoxy, 2-methylphenoxy, 4-methylphenoxy, 2,6-dimethylphenoxy, 2,4-di-t-butylphenoxy, 2,6-di-t-butylphenoxy, 2,6-di-t-butyl-4-methylphenoxy, 2,6-di-t-butyl-4-ethylphenoxy, 2,6-diphenylphenoxy, 1-naphthoxy, 2-naphthoxy, 9-phenanthryloxy and 1-pyrenyloxy groups; and aryloxy groups having a substitutent, such as a 7-methoxy-2-naphthoxy group.

Examples of the arylenedioxy group that may have a substituent, which can be formed by bonding $R^2$ and $R^3$ to each other, include groups wherein hydrogen atoms of two phenolic hydroxyl groups are removed from 2,2'-biphenol, 2,2'-methylenebisphenol, 2,2'-methylenebis(4-methyl-6-t-butylphenol), (R)-(+)-1,1'-bi-2-naphthol, (S)-(−)-1,1'-bi-2-naphthol or the like.

Concerning the aryloxy group which may have a substituent or the arylenedioxy group which may have a substituent, this substituent may be at least one substituent. In this case, examples of the substituent include alkoxy groups such as a methoxy group, an ethoxy group, an isopropoxy group and a t-butoxy group, and halogen atoms such as chlorine and bromine.

Examples of the monovalent saturated hydrocarbon group that may have a substituent, which can be each independently represented by $R^1$, $R^5$ and $R^6$ in the general formulae (I) and (II), include alkyl groups such as methyl, ethyl, n-propyl, isopropyl, n-butyl, isobutyl, sec-butyl, t-butyl, 2-methylbutyl, 3-methylbutyl, n-octyl, and 2-ethylhexyl groups; and cycloalkyl groups such as a cyclohexyl group. Examples of the monovalent aromatic hydrocarbon group that may have a substituent, which can be each independently represented by $R^1$, $R^5$ and $R^6$, include aryl groups such as a phenyl group; and aralkyl groups such as a benzyl group. Examples of the alkoxy group that may have a substituent, which can be each independently represented by $R^1$, $R^5$ and $R^6$, include methoxy, ethoxy, isopropoxy, and t-butoxy groups. Examples of the N,N-disubstituted amino group, which can be each independently represented by $R^1$, $R^5$ and $R^6$, include dialkylamino groups such as dimethylamino, diethylamino and diisopropylamino groups; and a bis(trimethylsilyl)amino group. Examples of the substituent which each of the monovalent saturated hydrocarbon group, the monovalent aromatic hydrocarbon group, the alkoxy group and the N,N-disubstituted amino group has include alkoxy groups such as methoxy, ethoxy, isopropoxy and t-butoxy groups; and halogen atoms such as chlorine and bromine.

$R^1$, $R^2$ and $R^3$ in the general formula (I) may have the same chemical structure or different chemical structures so far as the chemical structure(s) is/are within the above-defined range. In the same way, $R^5$ and $R^6$ in the general formula (II) may have the same chemical structure or different chemical structures so far as the chemical structure(s) is/are within the above-defined range.

Typical examples of the organoaluminum compound (A-1) include ethylbis(2,6-di-t-butyl-4-methylphenoxy)aluminum, ethylbis(2,6-di-t-butylphenoxy)aluminum, ethyl[2,2'-methylenebis(4-methyl-6-t-butylphenoxy)]aluminum, isobutylbis(2,6-di-t-butyl-4-methylphenoxy)aluminum, isobutylbis(2,6-di-t-butylphenoxy)aluminum, isobutyl[2,2'-methylenebis(4-methyl-6-t-butylphenoxy)]aluminum, n-octylbis(2,6-di-t-butyl-4-methylphenoxy)aluminum, n-octylbis(2,6-di-t-butylphenoxy)aluminum, n-octyl[2,2'-methylenebis(4-methyl-6-t-butylphenoxy)]aluminum, methoxybis(2,6-di-t-butyl-4-methylphenoxy)aluminum, methoxybis(2,6-di-t-butylphenoxy)aluminum, methoxy[2,2'-methylenebis(4-methyl-6-t-butylphenoxy)]aluminum, ethoxybis(2,6-di-t-butyl-4-methylphenoxy)aluminum, ethoxybis(2,6-di-t-butylphenoxy)aluminum, ethoxy[2,2'-methylenebis(4-methyl-6-t-butylphenoxy)]aluminum, isopropoxybis(2,6-di-t-butyl-4-methylphenoxy)aluminum, isopropoxybis(2,6-di-t-butylphenoxy)aluminum, isopropoxy[2,2'-methylenebis(4-methyl-6-t-butylphenoxy)]aluminum, t-butoxybis(2,6-di-t-butyl-4-methylphenoxy)aluminum, t-butoxybis(2,6-di-t-butylphenoxy)aluminum, t-butoxy[2,2'-methylenebis(4-methyl-6-t-butylphenoxy)]aluminum, tris(2,6-di-t-butyl-4-methylphenoxy)aluminum, and tris(2,6-diphenylphenoxy)aluminum. Among these organoaluminum compounds (A-1), isobutylbis(2,6-di-t-butyl-4-methylphenoxy)aluminum, isobutylbis(2,6-di-t-butylphenoxy)aluminum, isobutyl[2,2'-methylenebis(4-methyl-6-t-butylphenoxy)]aluminum and the like are especially preferred from the viewpoints of high polymerization initiation efficiency, high living polymerization property, easiness of acquisition and handling, and the like.

Typical examples of the organoaluminum compound (A-2) include diethyl(2,6-di-t-butyl-4-methylphenoxy)aluminum, diethyl(2,6-di-t-butylphenoxy)aluminum, diisobutyl(2,6-di-t-butyl-4-methylphenoxy)aluminum, diisobutyl(2,6-di-t-butylphenoxy)aluminum, di-n-octyl(2,6-di-t-butyl-4-methylphenoxy)aluminum, and di-n-octyl(2,6-di-t-butylphenoxy)aluminum.

The process for producing the organoaluminum compound (A) is not especially limited. The compound (A) can be produced, for example, according to any known process.

In the present invention, one of the organoaluminum compounds (A) may be used, or two or more thereof may be used in combination.

The amount of the organoaluminum compound (A) in the present invention may be appropriately selected dependently on the kind of polymerization operation, the kind of a solvent constituting a polymerization system when solution polymerization is performed, other various polymerization conditions, and the like. In general, the organoaluminum compound (A) is used in an amount of preferably 0.3 to 300 moles and more preferably 1 to 100 moles per mole of the used anionic polymerization initiator.

The Lewis base used in the present invention is at least one Lewis base selected from the group consisting of ether compounds and tertiary polyamine compounds. This Lewis base may be referred to as "Lewis base (B)" hereinafter.

The above-mentioned ether compound can be appropriately selected from compounds which have in the molecule thereof an ether bond (—O—) and do not comprise any metal component and be used so far as the compounds do not have an adverse effect on polymerization reaction. Preferably, the ether compound is selected from cyclic ether compounds having in the molecule thereof two or more ether bonds and acyclic ether compounds having in the molecule thereof one or more ether bonds from the viewpoints of high effects such as high polymerization initiation efficiency and high living polymerization property upon polymerization. Specific examples of the cyclic ether compound having in the molecule thereof two or more ether bonds include crown ethers such as 12-crown-4, 15-crown-5 and 18-crown-6. Specific examples of the acyclic ether compound having in the molecule thereof one or more ether bonds include acyclic monoether compounds such as dimethyl ether, diethyl ether, diisopropyl ether, dibutyl ether and anisole; acyclic diether compounds such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diisopropoxypropane, 1,2-dibutoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, 1,4-dimethoxybutane, 1,4-diethoxybutane, 1,4-diisopropoxybutane and 1,4-dibutoxybutane, 1,4-diphenoxybutane; acyclic triether compounds such as diethylene glycol dimethyl ether, dipropylene glycol dimethyl ether, dibutylene glycol dimethyl ether, diethylene glycol diethyl ether, dipropylene glycol diethyl ether and dibutylene glycol diethyl ether; dialkyl ethers of polyalkylene glycols such as triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol diethyl ether, tetraethylene glycol diethyl ether, tetrapropylene glycol diethyl ether and tetrabutylene glycol diethyl ether. Among the above-mentioned specific examples of the ether compounds, the acyclic ether compounds are preferred, and diethyl ether and 1,2-dimethoxyethane are especially preferred since they have a little adverse effect on the organoaluminum compound (A), they exhibit the effect of the present invention especially remarkably and they can easily be obtained.

If the cyclic ether compound having in the molecule thereof one ether bond, for example, tetrahydrofuran or such an epoxy compound as propyleneoxide, is caused to be present in the polymerization system according to the present invention, the ether compound may interact with the organoaluminum compound (A) too strongly or react directly with the anionic polymerization initiator or the living polymer that is growing. In general, therefore, it is preferred to avoid the use of the cyclic ether compound as the Lewis base (B).

The tertiary polyamine compound can be appropriately selected from compounds having in the molecule thereof two or more tertiary amine structures and be used so far as the compounds do not have an adverse effect on polymerization reaction. The "tertiary amine structure" in the present invention means a partial chemical structure wherein three carbon atoms are bonded to one nitrogen atom, which nitrogen atom may constitute a part of an aromatic ring so far as the nitrogen atom is bonded to three carbon atoms.

Preferred specific examples of the tertiary polyamine compound include chain-form polyamine compounds such as N,N,N', N'-tetramethylethylenediamine, N,N,N',N'-tetraethylethylenediamine, N,N,N',N",N"-pentamethyldiethylenetriamine, 1,1,4,7,10,10-hexamethyltriethylenetetraamine and tris[2-(dimethylamino)ethyl]amine; non-aromatic heterocyclic compounds such as 1,3,5-trimethylhexahydro-1,3,5-triazine, 1,4,7-trimethyl-1,4,7-triazacyclononane and 1,4,7,10,13,16-hexamethyl-1,4,7,10,13,16-hexaazacyclooctadecane; and aromatic heterocyclic compounds such as 2,2'-bipyridyl and 2,2':6',2"-terpyridine.

It is not preferred to use a tertiary monoamine compound such as triethylamine instead of the Lewis base (B) since polymerization initiation efficiency and living polymerization property upon polymerization drop.

In the present invention, any compound having in the molecule thereof one or more ether bonds and one tertiary amine structure can be regarded as the above-mentioned ether compound. Any compound having in the molecule thereof one or more ether bonds and two or one tertiary amine structures can be regarded as either the above-mentioned ether compound or the above-mentioned tertiary polyamine compound. Therefore, any compound having in the molecule thereof one or more ether bonds and one or more tertiary amine structures can be used as the Lewis base (B).

In the present invention, one or more ether compounds, one or more tertiary polyamine compounds, or both of them may be used as the Lewis base(s) (B) in the present invention.

The amount of the Lewis base (B) is not limited in the polymerization reaction according to the present invention. In order to exhibit sufficiently such effects as high polymerization initiation efficiency and high living polymerization property upon the polymerization, the total mole number of the used Lewis base (B) is preferably 0.1 time or more, more preferably 0.3 time or more, and most preferably 0.5 time or more the mole number of the used anionic polymerization initiator. The upper limit of the amount of the Lewis base (B) is not limited. The Lewis base (B) may be used as a solvent for polymerization reaction. However, if the amount thereof is too large, polymerization initiation efficiency trends to drop. Therefore, in order that the polymerization initiation efficiency does not drop very much, it is generally preferred to set the total amount of the Lewis base (B) to 95% or less by weight of the polymerization system.

The polymerization reaction according to the present invention can be performed without use of an organic solvent. However, it is preferred to perform the polymerization reaction by solution polymerization in an organic solvent since the temperature of the polymerization can be controlled and conditions in the polymerization system can be made uniform so as to cause the polymerization to advance smoothly. In this case, it is generally preferred to use a hydrocarbon solvent such as toluene, xylene, cyclohexane or methylcyclohexane, a halogenated hydrocarbon solvent such as chloroform, methylene chloride or carbon tetrachloride, or an ester solvent such as dimethyl phthalate because safety upon handling of the reagent is relatively high, the solvent is not easily mixed with waste fluid and the solvent is easily recovered and purified. These organic solvents may be used either alone or in combination of two or more thereof. It is preferred to purify the organic solvent used in the polymerization beforehand by deaeration or dehydration.

In the case that the organic solvent is used, the amount thereof can be appropriately adjusted dependently on the, degree of polymerization of a target polymer, the kinds of the used monomer, anionic polymerization initiator, organoaluminum compound (A), Lewis base (B) and solvent, and the like. In general, it is preferred to use the organic solvent in an amount of 200 to 3000 parts by weight per 100 parts of the used anionic polymerizable monomer because of smooth advance of the polymerization, easiness of separation of the resultant polymer, a reduction in a burden of treatment of waste fluid, and the like.

The method of adding, to the polymerization system, the anionic polymerization initiator, the organoaluminum compound (A), the Lewis base (B) and the anionic polymerizable monomer is not especially limited. As this method, a preferred method may be appropriately adopted. Concerning the Lewis base (B), however, it is preferred to adopt such a manner that the Lewis base (B) contacts the organoaluminum compound (A) before the contact with anionic polymerization initiator. The organoaluminum compound (A) may be added to the polymerization system before the addition of the anionic polymerizable monomer, or may be added thereto at the same time of the addition of the anionic polymerizable monomer (In the latter case, the organoaluminum compound (A) and the monomer may be added in the form of a mixture thereof).

In the case that two or more anionic polymerizable monomers are used in the polymerization reaction according to the present invention, a copolymer can be obtained. In this case, any one of copolymer forms, such as random, block and tapered forms, can be produced dependently on the method of adding the monomer (for example, simultaneous addition of two or more monomers, separate addition thereof at intervals of a given time, or the like), a combination of the monomers and the like in the same manner as in usual anionic polymerization. Since high living polymerization property can be exhibited according to the polymerization process of the present invention, the present invention is especially suitable for production of a block copolymer for which a high blocking efficiency is required.

If necessary, one or more of known other additives may be added to the polymerization system in the polymerization according to the present invention, as in known anionic polymerization techniques. Examples of the additives include inorganic salts such as lithium chloride; metal alkoxide compounds such as lithium methoxyethoxyethoxide and potassium t -butoxide; and organic quaternary salts such as tetraethylammonium chloride and tetraethylphosphonium bromide.

The temperature of the reaction system is not especially limited in the polymerization according to the present invention. A suitable temperature condition may be appropriately selected dependently on the kind of the used anionic polymerizable monomer, and the like, and be used. In many cases, a temperature within the range of $-60°$ C. to $-100°$ C. is preferably adopted, and a temperature within the range of $-30°$ C. to $+50°$ C. is more preferably adopted. If polymerization temperature is too low upon polymerization of an acrylic acid ester, the stereoregularity of the resultant polymer becomes high so that the polymer has crystallinity. Therefore, in order to produce an acrylic acid ester polymer having excellent flexibility, polymerization temperature is preferably $-50°$ C. or higher. In the polymerization process according to the present invention, cooling conditions for the polymerization system can be made milder than in anionic polymerization in the prior art so that high living polymerization property can be attained even if the polymerization is performed at a temperature nearer to room temperature.

It is preferred to perform the polymerization reaction according to the present invention in the atmosphere of an inert gas such as nitrogen, argon or helium. Furthermore, in order that the reaction system becomes uniform, it is preferred to perform the polymerization under a sufficient stirring condition.

In the polymerization reaction according to the present invention, the time necessary for the polymerization may be appropriately selected. According to the polymerization process of the present invention, however, the polymerization can be caused to advance at a high speed. In the case that, for example, a methacrylic acid ester is used as the anionic polymerizable monomer, the polymerization can be completed within several minutes although the time necessary for the polymerization depends on adopted various conditions. In the case that an acrylic acid ester is used as the anionic polymerizable monomer, the polymerization can be completed within several tens of seconds. Accordingly, the polymerization reaction according to the present invention can be performed by "continuous tube reactor polymerization", which has high productivity and good cooling efficiency.

In the present invention, the polymerization reaction can be stopped by adding a polymerization terminator to the reaction mixture, as in known anionic polymerization, at the stage when a target polymer chain is formed by the polymerization reaction. As the polymerization terminator, a protic compound such as methanol, acetic acid or a solution of a hydrochloric acid in methanol may be used. The amount of the polymerization terminator is not especially limited. In general, it is preferred that the polymerization terminator is used in an amount of 1 to 100 moles per mole of the anionic polymerization initiator used as the polymerization initiator.

In the present invention, a terminal functional group supplying agent (for example, aldehyde, lactone or carbon dioxide) may be added to the reaction system after complete finish of the given polymerization and before the addition of the polymerization terminator. In this case, it is possible to obtain a polymer having, at the terminal of its molecular chain, a functional group such as a hydroxyl group or a carboxyl group.

If metal components originating from the used anionic polymerization initiator or the organoaluminum compound (A) remain in the polymer obtained by separation from the reaction mixture wherein the polymerization has been stopped, a drop in physical properties of the polymer or a material using the polymer, a deterioration in transparency thereof, or the like may arise. For some purposes of the use of the polymer, therefore, it is preferred to remove the metal compounds originating from the used anionic polymerization initiator or the organoaluminum compound (A) after the finish of the polymerization. An efficient method for removing the metal compounds is a method of subjecting the polymer to cleaning treatment such as washing treatment with an acidic solution or adsorbing treatment with an adsorbent such as an ion-exchange resin. Examples of the acidic solution that can be used include hydrochloric acid, aqueous sulfuric acid solution, aqueous nitric acid solution, aqueous acetic acid solution, aqueous propionic acid solution, and aqueous citric acid solution.

The method for separating a polymer from the reaction mixture after the polymerization is stopped is not especially limited and can be adopted from all known methods. For example, it is possible to adopt a method comprising pouring the reaction mixture into a poor solvent for a polymer to precipitate the polymer, a method comprising distilling out a solvent from the reaction mixture to obtain a polymer, or the like.

According to the present invention, it is possible to produce a polymer having any molecular weight. The molecular weight of a polymer that can be produced extends over a wide range. From the viewpoints of handling performances, fluidity and mechanical properties of the resultant polymer, and the like, it is in general preferred that the number-average molecular weight is from 1000 to 1000000. According to the present invention, a polymer having high molecular weight uniformity (that is, a narrow molecular weight distribution) can be usually obtained. Thus, it is possible to produce a polymer having a molecular weight distribution (Mw/Mn) of 1.5 or less. It is however possible to obtain intentionally a polymer having a wide molecular weight distribution by controlling the addition speed of the anionic polymerizable monomer to the polymerization system, the diffusion rate of the monomer inside the polymerization system, or the like.

The present invention will be more specifically described hereinafter by way of working examples, but the present invention is not limited to these examples.

In these examples and the like, used chemicals were dried and purified in the usual way, and were then deaerated with nitrogen. The transportation and supply of the chemicals were performed in the atmosphere of nitrogen.

EXAMPLE 1

An agitating stick with a half-moon shaped wing was set in a three-necked flask having a inner volume of 1 liter, and then the atmosphere inside the system was replaced by nitrogen. Into this flask were added 300 ml of toluene, 2.7 g of 1,2-dimethoxyethane and 40 ml of a toluene solution containing 20.0 mmoles of diisobutyl(2,6-di-t-butyl-4-methylphenoxy)aluminum. The resultant solution was cooled to −30° C. To this solution was added 1.54 ml of a cyclohexane solution containing 2.0 mmoles of sec-butyllithium, and the resultant solution was stirred for 20 minutes.

While the solution was being vigorously stirred, 20.0 g of methyl methacrylate was dropwise added to this solution at −30° C. over about 3 minutes. The solution first colored to yellow. After 1 minutes from the end of the addition by the dropping, the solution faded. After 3 minutes from the end of the addition by the dropping, 5 ml of methanol was added thereto, so that the polymerization reaction was stopped.

The resultant solution was poured into 3 liters of methanol to precipitate the resultant polymer and recover the polymer.

The yield of the resultant polymer (poly(methyl methacrylate)) was about 100%. The molecular weight of the resultant polymer reduced to polystyrene was measured by GPC (gel permeation chromatography). As a result, the Mn (number-average molecular weight) thereof was 34700, and the Mw/Mn (molecular weight distribution) thereof was 1.10. It was also found that the polymerization initiation efficiency thereof was Polymerization conditions and polymerization results are shown in Table 1 described later.

EXAMPLE 2

A polymerization manner and a polymerization termination manner were performed in the same way as in Example 1 except that 28 ml of a toluene solution containing 14.0 mmoles of isobutylbis(2,6-di-t-butyl-4-methylphenoxy) aluminum was used as a solution of an organoaluminum compound in toluene instead of 40 ml of the toluene solution containing 20.0 mmoles of diisobutyl(2,6-di-t-butyl-4-methylphenoxy)aluminum; 0.77 ml of a cyclohexane solution containing 1.0 mmole of sec-butyllithium was used as a solution of sec-butyllithium in cyclohexane instead of 1.54 ml of the cyclohexane solution containing 2.0 mmoles of sec-butyllithum; the temperature upon the polymerization was changed from −30° C. to 0° C.; the amount of the anionic polymerizable monomer (methyl methacrylate) was changed from 20.0 g to 10.0 g; and the time for the polymerization (the time from the end of addition of the monomer to the termination of the polymerization) was changed from 3 minutes to 80 minutes.

The yield of the resultant polymer (poly(methyl methacrylate)) was about 100%. The Mn of the resultant polymer was 10600, and the Mw/Mn thereof was 1.06. The polymerization initiation efficiency thereof was 0.94.

Polymerization conditions and polymerization results are shown in Table 1 described later.

EXAMPLE 3

A polymerization manner and a polymerization termination manner were performed in the same way as in Example 2 except that the amount of 1,2-dimethoxyethane was changed to 8.1 g and other polymerization conditions were changed as shown in Table 1.

The yield of the resultant polymer (poly(methyl methacrylate)) was about 100%. The Mn of the resultant polymer was 9800, and the Mw/Mn thereof was 1.06. The polymerization initiation efficiency thereof was 1.02.

Polymerization conditions and polymerization results are shown in Table 1 described later.

EXAMPLE 4

A polymerization manner and a polymerization termination manner were performed in the same way as in Example 2 except that 1.0 mmole of N,N,N',N'-tetramethylethylenediamine was used instead of 2.7 g of 1,2-dimethoxyethane and other polymerization conditions were changed as shown in Table 1.

The yield of the resultant polymer (poly(methyl methacrylate)) was about 100%. The Mn of the resultant polymer was 12500, and the Mw/Mn thereof was 1.06. The polymerization initiation efficiency thereof was 0.80.

Polymerization conditions and polymerization results are shown in Table 1 described later.

EXAMPLE 5

A polymerization manner and a polymerization termination manner were performed in the same way as in Example 1 except that 22 ml of a toluene solution containing 11.0 mmoles of isobutylbis(2,6-di-t-butyl-4-methylphenoxy) aluminum was used as a solution of an organoaluminum compound in toluene instead of 40 ml of the toluene solution containing 20.0 mmoles of diisobutyl(2,6-di-t-butyl-4-methylphenoxy)aluminum; 0.77 ml of a cyclohexane solution containing 1.0 mmole of sec-butyllithium was used as a solution of sec-butyllithium in cyclohexane instead of 1.54 ml of the cyclohexane solution containing 2.0 mmoles of sec-butyllithium; the kind and the amount of the anionic polymerizable monomer were changed from methyl methacrylate and 20.0 g, respectively, to n-butyl acrylate and 10.0 g, respectively; and the time for the polymerization (the time from the end of addition of the monomer to the termination of the polymerization) was changed from 3 minutes to 1 minute.

The yield of the resultant polymer (poly(n-butyl acrylate)) was about 100%. The Mn of the resultant polymer was 11600, and the Mw/Mn thereof was 1.08. The polymerization initiation efficiency thereof was 0.86.

Polymerization conditions and polymerization results are shown in Table 1 described later.

EXAMPLE 6

A polymerization manner and a polymerization termination manner were performed in the same way as in Example 5 except that 11.0 mmoles of isobutylbis(2,6-di-t-butyl-4-methylphenoxy)aluminum was changed to the same mmoles of ethylbis(2,6-di-t-butyl-4-methylphenoxy)aluminum.

The yield of the resultant polymer (poly(n-butyl acrylate)) was about 100%. The Mn of the resultant polymer was 14200, and the Mw/Mn thereof was 1.21. The polymerization initiation efficiency thereof was 0.70.

Polymerization conditions and polymerization results are shown in Table 1 described later.

EXAMPLE 7

A polymerization manner and a polymerization termination manner were performed in the same way as in Example 5 except that 1.0 mmole of N,N,N',N'-tetramethylethylenediamine was used instead of 2.7 g of 1,2-dimethoxyethane.

The yield of the resultant polymer (poly(n-butyl acrylate)) was about 100%. The Mn of the resultant polymer was 14800, and the Mw/Mn thereof was 1.05. The polymerization initiation efficiency thereof was 0.68.

EXAMPLE 8

A polymerization manner and a polymerization termination manner were performed in the same way as in Example 5 except that 5.4 g of diethyl ether was used instead of 2.7 g of 1,2-dimethoxyethane.

The yield of the resultant polymer (poly(n-butyl acrylate)) was about 100%. The Mn of the resultant polymer was 14000, and the Mw/Mn thereof was 1.23. The polymerization initiation efficiency thereof was 0.71.

Polymerization conditions and polymerization results are shown in Table 1 described later.

REFERENCE EXAMPLE 1

A polymerization manner and a polymerization termination manner were performed in the same way as in Example 1 except that the use of 1,2-dimethoxyethane was omitted and the polymerization time was extended from 3 minutes to 120 minutes. However, no polymer was recovered.

Polymerization conditions and polymerization results are shown in Table 1 described later.

REFERENCE EXAMPLE 2

A polymerization manner and a polymerization termination manner were performed in the same way as in Example 2 except that the use of 1,2-dimethoxyethane was omitted and the polymerization time was extended from 80 minutes to 120 minutes. However, no polymer was recovered.

Polymerization conditions and polymerization results are shown in Table 1 described later.

REFERENCE EXAMPLE 3

A polymerization manner and a polymerization termination manner were performed in the same way as in Example 5 except that the use of 1,2-dimethoxyethane was omitted and the polymerization time was extended from 1 minutes to 120 minutes.

The yield of the resultant polymer (poly(n-butyl acrylate)) was about 52%. The Mn of the resultant polymer was 17600, and the Mw/Mn thereof was 1.66. The polymerization initiation efficiency thereof was 0.30.

Polymerization conditions and polymerization results are shown in Table 1 described later.

REFERENCE EXAMPLE 4

A polymerization manner and a polymerization termination manner were performed in the same way as in Example 1 except that 40 ml of a toluene solution containing 20.0 mmoles of triisobutylaluminum was used as a solution of an organoaluminum in toluene instead of 40 ml of the toluene solution containing 20.0 mmoles of diisobutyl(2,6-di-t-butyl-4-methylphenoxy)aluminum and the polymerization time was extended from 3 minutes to 120 minutes. However, no polymer was recovered.

Polymerization conditions and polymerization results are shown in Table 1 described later.

REFERENCE EXAMPLE 5

A polymerization manner and a polymerization termination manner were performed in the same way as in Example 5 except that 1.0 mmole of tetramethylammonium chloride was used instead of 2.7 g of 1,2-dimethoxyethane and the polymerization time was extended from 1 minute to 120 minutes. The added tetramethylammonium chloride was hardly dissolved and during the polymerization insoluble substances were recognized in the polymerization system.

The yield of the resultant polymer (poly(n-butyl acrylate)) was about 32%. The Mn of the resultant polymer was 15200, and the Mw/Mn thereof was 1.50. The polymerization initiation efficiency thereof was 0.21.

Polymerization conditions and polymerization results are shown in Table 1 described later.

TABLE 1

| | Polymerization conditions | | | | | | | | | Polymerization results | | |
|---|---|---|---|---|---|---|---|---|---|---|---|---|
| | Polymerization initiator (mmoles) | Lewis base (% or mmoles) | | Organoaluminum compound (mmoles) | | Monomer (g) | | Temp. (°C.) | Time (min.) | Yield (%) | Mn | Mw/Mn | Polymerization initiation efficiency |
| Example 1 | s-BLi 2.0 | DME | 1.0% | iB2Al(BHT) | 20.0 | MMA | 20.0 | −30 | 3 | 100 | 34700 | 1.10 | 0.29 |
| Example 2 | s-BLi 1.0 | DME | 1.0% | iBAl(BHT)2 | 14.0 | MMA | 10.0 | 0 | 80 | 100 | 10600 | 1.06 | 0.94 |
| Example 3 | s-BLi 1.0 | DME | 3.0% | iBAl(BHT)2 | 14.0 | MMA | 10.0 | 0 | 40 | 100 | 9800 | 1.06 | 1.02 |
| Example 4 | s-BLi 1.0 | TMEDA | 1.0 mmole | iBAl(BHT)2 | 14.0 | MMA | 10.0 | 0 | 45 | 100 | 12500 | 1.06 | 0.80 |
| Example 5 | s-BLi 1.0 | DME | 1.0% | iBAl(BHT)2 | 11.0 | nBA | 10.0 | −30 | 1 | 100 | 11600 | 1.08 | 0.86 |
| Example 6 | s-BLi 1.0 | DME | 1.0% | EtAl(BHT)2 | 11.0 | nBA | 10.0 | −30 | 1 | 100 | 14200 | 1.21 | 0.70 |
| Example 7 | s-BLi 1.0 | TMEDA | 1.0 mmole | iBAl(BHT)2 | 11.0 | nBA | 10.0 | −30 | 1 | 100 | 14800 | 1.05 | 0.68 |
| Example 8 | s-BLi 1.0 | Et$_2$O | 2.0% | iBAl(BHT)2 | 11.0 | nBA | 10.0 | −30 | 1 | 100 | 14000 | 1.23 | 0.71 |
| Reference Example 1 | s-BLi 2.0 | — | — | iB2Al(BHT) | 20.0 | MMA | 20.0 | −30 | 120 | Not polymerized | | | |
| Reference Example 2 | s-BLi 1.0 | — | — | iBAl(BHT)2 | 14.0 | MMA | 10.0 | 0 | 120 | Not polymerized | | | |
| Reference Example 3 | s-BLi 1.0 | — | — | iBAl(BHT)2 | 11.0 | nBA | 10.0 | −30 | 120 | 52 | 17600 | 1.66 | 0.30 |
| Reference Example 4 | s-BLi 2.0 | DME | 1.0% | iB3Al | 20.0 | MMA | 20.0 | −30 | 120 | Not polymerized | | | |
| Reference Example 5 | s-BLi 1.0 | Me$_4$NCl | 1.0 mmole | iBAl(BHT)2 | 11.0 | nBA | 10.0 | −30 | 120 | 32 | 15200 | 1.50 | 0.21 |

Symbols in the above Table 1 have the following meanings.
s-BLi: sec-butyllithium,
DME: 1,2-dimethoxyethane,
TMEDA: N,N,N',N'-tetramethylethylenediamine,
Et$_2$O: diethyl ether,
Me$_4$NCl: tetramethylammonium chloride,
iB2Al(BHT): diisobutyl(2,6-di-t-butyl-4-methylphenoxy) aluminum,
iBAl(BHT)2: isobutylbis(2,6-di-t-butyl-4-methylphenoxy) aluminum,
EtAl(BHT)2: ethylbis(2,6-di-t-butyl-4-methylphenoxy) aluminum,
iB3Al: triisobutylaluminum,
MMA: methyl methacrylate, and
nBA: n-butyl acrylate.

It can be understood from the results shown in Table 1 that even if in the polymerization processes in Examples 1–8 according to the present invention, polymerization of the polar anionic polymerizable monomer was performed under a mild cooling temperature condition of −3° C. or 0° C. using sec-butyllithium suitable for industrial use as an anionic polymerization initiator, the desired polymer having a narrow molecular weight distribution (Mw/Mn= 1.05–1.23) was able to be produced with a high yield (100%) for a short polymerization time (1–80 minutes). Moreover, it can be understood that the polymerization initiator efficiency in these polymerization processes was relatively high (0.29–1.02) and in the case of using the organoaluminum compound (A-1) as the organoaluminum compound (A), the polymerization initiator efficiency was especially high (0.68–1.02).

On the other hand, it can be understood that even if the extended polymerization time (120 minutes) was adopted in the polymerization processes of Reference Examples 1–3, which were different from the present invention in that the addition of any Lewis base was omitted, polymerization did not advance substantially (Reference Examples 1 and 2). Alternatively, even in the case wherein the monomer was polymerized (Reference Example 3), the molecular weight distribution of the resultant polymer was relatively wide (Mw/Mn=1.66) and the yield of the polymer was low (52%). Besides, the polymerization initiation efficiency thereof was relatively low (it was 0.68–0.86 in Examples 5, 7 and 8 but it was 0.30 in Reference Example 3). It can be understood that even if the extended polymerization time (120 minutes) was adopted in Reference Example 4, which was different from the present invention in that an organoaluminum compound having no chemical structure represented by Al—O—Ar as an organoaluminum compound was used, polymerization did not advance substantially. It can also be understood that even if the extended polymerization time (120 minutes) was adopted in Reference Example 5, which was different from the present invention in that an organoquaternary salt (tetramethylammonium chloride) was used instead of the ether compound or tertiary polyamine compound, the molecular weight distribution of the resultant polymer was relatively wide (Mw/Mn=1.50) and the yield of the polymer was low (32%). Besides, the polymerization initiation efficiency thereof was also relatively low (it was 0.68–0.86 in Examples 5,7 and 8 but it was 0.21 in Reference Example 5).

EXAMPLE 9

Example of two-stage polymerization of n-butyl acrylate

As will be specifically described below, in the present example, n-butyl acrylate was polymerized at −3° C. (the first stage polymerization), and after the polymerization, the resultant was preserved at the same temperature for 1 hour. Thereafter, the second stage polymerization was performed at −30° C. by adding n-butyl acrylate thereto.
(1) An agitating stick with a half-moon shaped wing was set in a three-necked flask having a inner volume of 1 liter, and then the atmosphere inside the system was replaced by nitrogen. Into this flask were added 300 ml of toluene, 2.7 g (30 mmoles) of 1,2-dimethoxyethane and 22 ml of a toluene solution containing 11.0 mmoles of isobutylbis (2,6-di-t-butyl-4-methylphenoxy)aluminum. The resultant solution was cooled to −3° C. To this solution was added 0.77 ml of a cyclohexane solution containing 1.0 mmole of sec-butyllithium, and the resultant solution was stirred for 20 minutes.

While the solution was being vigorously stirred, 10.0 g of n-butyl acrylate was dropwise added to this solution at −30° C. over about 3 minutes. The solution first colored to yellow. After 1 minutes from the end of the addition by the dropping, the solution faded.

(2) A part of the solution was sampled after 1 minute from the end of the addition by the dropping. The conversion of the monomer was measured. As a result, it was proved that the conversion was about 100%. The molecular weight of the resultant polymer (poly(n-butyl acrylate)) reduced to polystyrene was measured by GPC. As a result, it was found that the Mn thereof was 14000 and the Mw/Mn thereof was 1.09.

(3) The solution obtained in the above-mentioned item (1) was kept at −30° C. under stirring for 1 hour after the end of the addition by the dropping. Thereafter, 30.0 g of n-butyl acrylate was added to this solution to perform polymerization at −30° C. for 1 hour. Next, 5 ml of methanol was added thereto, so as to terminate the polymerization reaction.

(4) The solution obtained in the above-mentioned item (3) was poured into 3 liters of methanol, and then the resultant polymer was precipitated and recovered.

The yield of the resultant polymer (poly(n-butyl acrylate)) was about 100%. The molecular weight of the resultant polymer reduced to polystyrene was measured by GPC. As a result, it was found that the Mn thereof was 56700 and the Mw/Mn thereof was 1.04. According to the GPC measurement, no peak was observed near the molecular weight of the polymer obtained by the first stage polymerization in the above-mentioned item (1). This fact demonstrates that the deactivation rate of the living polymer during the preservation from the end of the first stage polymerization in the above-mentioned item (1) to the start of the second stage polymerization in the above-mentioned item (3) was about 0% and its living polymerization property was kept at a high level.

The results are shown in Table 2.

Figure 1:
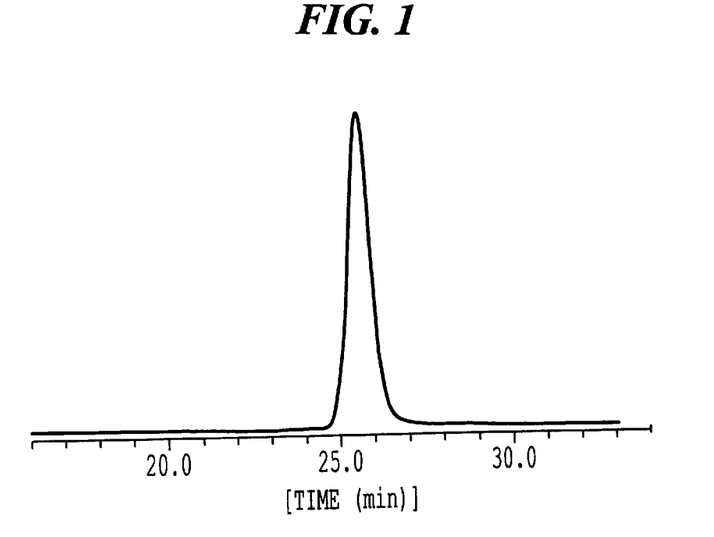
FIG. 1 is a GPC chart of poly(n-butyl acrylate) obtained as a final product in Example 9 according to the present invention. Its abscissa represents efflux time.

FIG. 1 shows a GPC chart of the polymer obtained by the second stage polymerization.

EXAMPLES 10–17

Examples of Two-stage Polymerization of n-butyl Acrylate

In the present examples, the same first stage polymerization manner, preservation manner, second stage polymerization manner and polymerization termination manner as in Example 9 were performed except that conditions shown in Table 2 were adopted as the kind and the added amount of used Lewis bases, and the temperature upon all periods of the first stage polymerization, the preservation (1 hour) and the second stage polymerization.

The results are shown in Table 2.

TABLE 2

| | Polymerization conditions and preservation conditions | | | Results of the first stage polymerization | | Deactivation | |
|---|---|---|---|---|---|---|---|
| | Lewis base | | Temperature upon polymerization and preservation | | | rate during the preservation period | Conversion of monomer at the second stage polymerization |
| | | (mmoles) | (° C.) | Mn | Mw/Mn | (%) | (%) |
| Example 9 | DME | 30 | −30 | 14000 | 1.09 | 0 | 100 |
| Example 10 | DME | 30 | 0 | 12000 | 1.12 | 41 | 100 |
| Example 11 | DME | 150 | 0 | 11000 | 1.25 | 22 | 100 |
| Example 12 | Diglyme | 30 | 0 | 14000 | 1.22 | 29 | 100 |
| Example 13 | 12-Crown-4 | 1.0 | 0 | 22000 | 1.27 | 32 | 100 |
| Example 14 | TMEDA | 3.0 | 0 | 18000 | 1.27 | 39 | 100 |
| Example 15 | PMDETA | 3.0 | 0 | 13000 | 1.22 | 23 | 100 |
| Example 16 | HMTETA | 3.0 | 0 | 12000 | 1.22 | 8 | 100 |
| Example 17 | PMDETA | 5.0 | 20 | 13000 | 1.26 | 55 | 100 |

Symbols in the above Table 2 have the following meanings.
DME: 1,2-dimethoxyethane,
Diglyme: diethylene glycol dimethyl ether,
TMEDA: N,N,N',N'-tetramethylethylenediamine,
PMDETA: N,N,N',N'',N''-pentamethyldiethylenetriamine, and
HMTETA: 1,1,4,7,10,10-hexamethyltriethylenetetraamine.

It can be understood from the results shown in Table 2 that even if 0° C. or a temperature near room temperature, which was a higher temperature than that in Example 9, was adopted as the temperature upon all periods of the first stage polymerization, the preservation and the second stage polymerization, the deactivation rate of the living polymer during the preservation was kept in the range of 55% or less in the polymerization processes in Examples 10–17 according to the present invention. Thus, it can be understood that the polymerization reaction advanced completely even in the second stage polymerization after the preservation.

REFERENCE EXAMPLE 6

Example of Two-stage Polymerization of n-butyl Acrylate

As will be specifically described below, in the present Reference Example, n-butyl acrylate was polymerized at −3° C. (the first stage polymerization), and after the polymerization, the resultant was preserved at the same temperature for 1 hour. Thereafter, the second stage polymerization was performed at −30° C. by adding n-butyl acrylate thereto.

(1) The same first stage polymerization as in the item (1) of Example 9 was performed except that 0.63 ml of a cyclohexane solution containing 1.0 mmole of t-butyllithium was used instead of 0.77 ml of the cyclohexane solution containing 1.0 mmole of sec-butyllithium and the addition of the 1,2-dimethoxyethane was omitted.

(2) A sample was collected from the solution obtained in the above-mentioned item (1) and was then measured in the same way as in the item (2) of Example 9. As a result, it was proved that the yield of the resultant polymer (poly(n-butyl acrylate)) was about 100%, the Mn thereof was 18800 and the Mw/Mn thereof was 1.25. According to the GPC measurement, tailing was slightly observed at the low molecular weight side.

(3) In the same way as in the item (3) of Example 9, the solution obtained in the above-mentioned item (1) was kept at −30° C. for 1 hour, and then the second polymerization and polymerization termination were performed.

(4) In the same way as in the item (4) of Example 9, a polymer (poly(n-butyl acrylate)) was recovered from the solution obtained in the above-mentioned item (3) and was then measured. As a result, it was found that the yield of the polymer was 59% and the conversion of the monomer at the second stage polymerization in the above-mentioned item (3) was 45%. The Mn of the resultant polymer was 27800, and the Mw/Mn thereof was 1.60. A peak corresponding to the polymer obtained by the first stage polymerization in the above-mentioned item (1) was considerably recognized. The rate of the area of the peak to that of the whole polymer was about 17%. It can be estimated from this fact that the deactivation rate of the living polymer during the preservation from the end of the first stage polymerization in the above-mentioned item (1) to the start of the second stage polymerization in the above-mentioned item (3) was about 40%.

Figure 2:
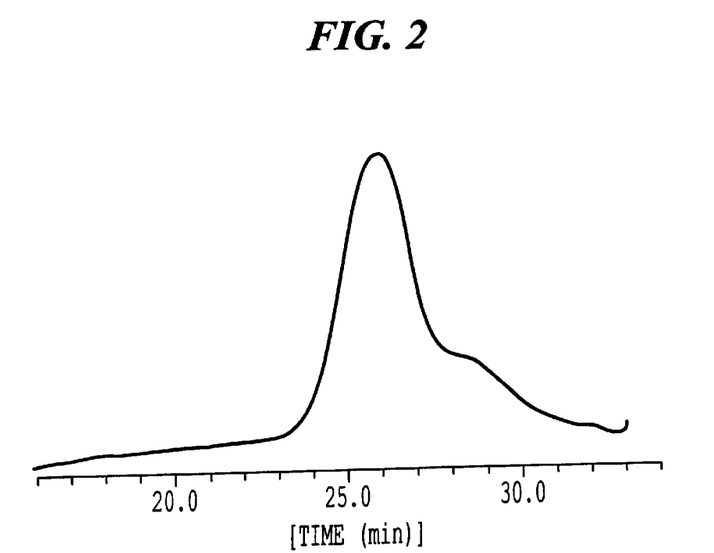
FIG. 2 is a GPC chart of poly(n-butyl acrylate) obtained as a final product in Reference Example 6 not according to the present invention. Its abscissa represents efflux time.

FIG. 2 shows a GPC chart of the polymer obtained by the second stage polymerization.

EXAMPLE 18

Example of a Block Copolymer of n-butyl Acrylate and Methyl Methacrylate

As will be specifically described below, in the present example, n-butyl acrylate was polymerized, and subsequently methyl methacrylate was added thereto so as to perform copolymerization.

(1) n-Butyl acrylate was polymerized in the same manner as in the item (1) of Example 9 except that the amount of sec-butyllithium was changed from 1.0 mmole to 1.4 mmoles.

(2) A sample was collected from the solution obtained in the above-mentioned item (1) after I minute from the addition by the dropping of n-butyl acrylate, and was then measured in the same way as in the item (2) of Example 9. As a result, it was proved that the yield of the resultant polymer (poly(n-butyl acrylate)) was about 100%, the Mn thereof was 9300 and the Mw/Mn thereof was 1.06.

Figures 3A, 3B:
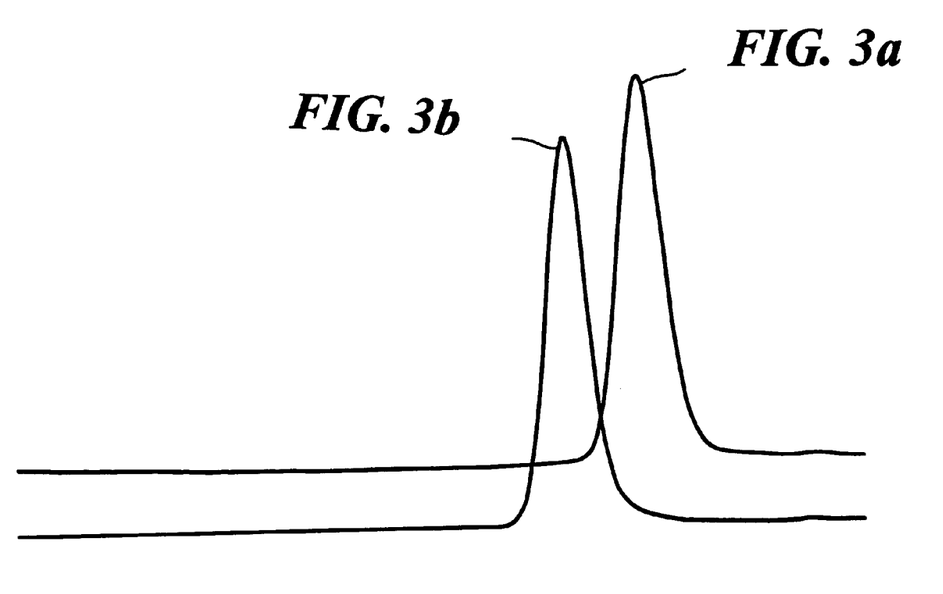
FIG. 3 is a GPC chart of poly(n-butyl acrylate) (a) obtained in a first polymerization step in Example 18 according to the present invention, and poly(n-butyl acrylate-b-methyl methacrylate) (b) obtained as a final product in a second polymerization step in said Example. Its horizontal direction corresponds to efflux time.

A curve (a) of FIG. 3 shows a GPC chart of the polymer obtained by the first stage polymerization in the above-mentioned item (1).

(3) The solution obtained in the above-mentioned item (1) was kept at −30° C. under stirring for 1.5 hour after the addition of the dropping. Thereafter, 30.0 g of methyl methacrylate was added to this solution, and then polymerization was performed at −3° C. for 6 hours. Next, 5 ml of methanol was added thereto, so as to terminate the polymerization reaction.

(4) The solution obtained in the above-mentioned item (3) was poured into 3 liters of methanol, to precipitate and recover the resultant polymer.

The yield of the polymer (poly(n-butyl acrylate-b-methyl methacrylate)) was about 75% and the conversion of methyl methacrylate in the above-mentioned item (3) was about 66%. The molecular weight of the resultant polymer reduced to polystyrene was measured by GPC. As a result, it was found that the Mn thereof was 18500 and the Mw/Mn thereof was 1.05. According to the GPC measurement, no peak was observed near the molecular weight of the polymer obtained by the first stage polymerization in the above-mentioned item (1). This fact demonstrates that the deactivation rate of the living polymer during the preservation from the end of the first stage polymerization in the above-mentioned (1) to the start of the second stage polymerization in the above-mentioned (3) was about 0% and a block copolymer having a very high block efficiency was obtained.

A curve (b) of FIG. 3 shows a GPC chart of the polymer obtained by the second stage polymerization.

As is evident from the above-mentioned examples, according to the anionic polymerization process of the present invention, a high polymerization initiation efficiency, a high polymerization rate and a high living polymerization property can be attained even if an anionic polymerizable monomer is polymerized, using an anionic polymerization initiator suitable for industrial use, under a relatively mild cooling temperature condition or a condition of a temperature near room temperature. According to the present invention, it is also possible to produce a polymer having a narrow molecular weight distribution and a block copolymer having a high block efficiency with industrial profitability.

What is claimed is:

1. An anionic polymerization process comprising:
   polymerizing anionic polymerizable monomer(s) in the presence of an anionic polymerization initiator, one or more tertiary organoaluminum compound(s) (A) having in the molecule thereof a chemical structure represented by a general formula: Al—O—Ar, wherein Ar is an aromatic ring, and at least one Lewis base (B) selected from the group consisting of tertiary polyamine compounds having in the molecule thereof two or more tertiary amine structures.

2. The process according to claim 1, wherein said anionic polymerization initiator is an organolithium compound having a chemical structure having a secondary carbon atom as a central anionic ion.

3. The process according to claim 1, wherein said anionic polymerizable monomer(s) are polar anionic polymerizable monomer(s).

4. The process according to claim 3, wherein said polar anionic polymerizable monomer(s) are α,β-unsaturated carboxylic acid ester compound(s), α,β-unsaturated carboxylic acid amide compound(s), α,β-unsaturated ketone compound(s), lactone compound(s), or mixtures thereof.

5. A process for producing a random, block or tapered copolymer, which comprises polymerizing two or more anionic polymerizable monomers by the anionic polymerization process according to claim 1.

6. The process according to claim 1, wherein said one or more tertiary organoaluminum compound(s) (A) is selected from the group consisting of the general formula (I) or (II):

$$AlR^1R^2R^3 \quad (I)$$

wherein $R^1$ is a monovalent saturated hydrocarbon group, which may have a substituent, a monovalent aromatic hydrocarbon group, which may have a substituent, an alkoxy group, which may have a substituent, an aryloxy group, which may have a substituent or an N,N-disubstituted amino group; $R^2$ and $R^3$ each independently is an aryloxy groups which may have a substituent; or $R^2$ and $R^3$ may be bonded to each other to form an arylenedioxy group, which may have a substituent; or $$AlR^4R^5R^6 \quad (II)$$

wherein $R^4$ is an aryloxy group, which may have a substituent; $R^5$ and $R^6$ each independent is a monovalent saturated hydrocarbon group, which may have a substituent, a monovalent aromatic hydrocarbon group, which may have a substituent, an alkoxy group, which may have a substituent, or an N,N-disubstituted amino group.

7. The process according to claim 1, wherein the tertiary polyamine compound is a linear polyamine compound.

8. The process according to claim 1, wherein the tertiary polyamine compound is selected from the group consisting of N,N,N',N'-tetramethylethylenediamine, N,N,N',N'-tetraethylethylenediamine, N,N,N',N",N"-pentamethyldiethylenetriamine, 1,1,4,7,10,10-hexamethyltriethylenetetraamine, tris[2-(dimethyl]amino)ethylamine, 1,3,5-trimethylhexahydro-1,3,5-triazine, 1,4,7-trimethyl-1,4,7-triazacyclononane, 1,4,7,10,13,16-hexamethyl-1,4,7,10,13,16-hexaazacyclooctadecane, 2,2'-bipyridyl and 2,2':6',2"-terpyridine.

* * * * *